July 11, 1961
G. E. AMMERMAN
2,992,312
ELECTRIC HEATERS
Filed June 20, 1957
2 Sheets-Sheet 2
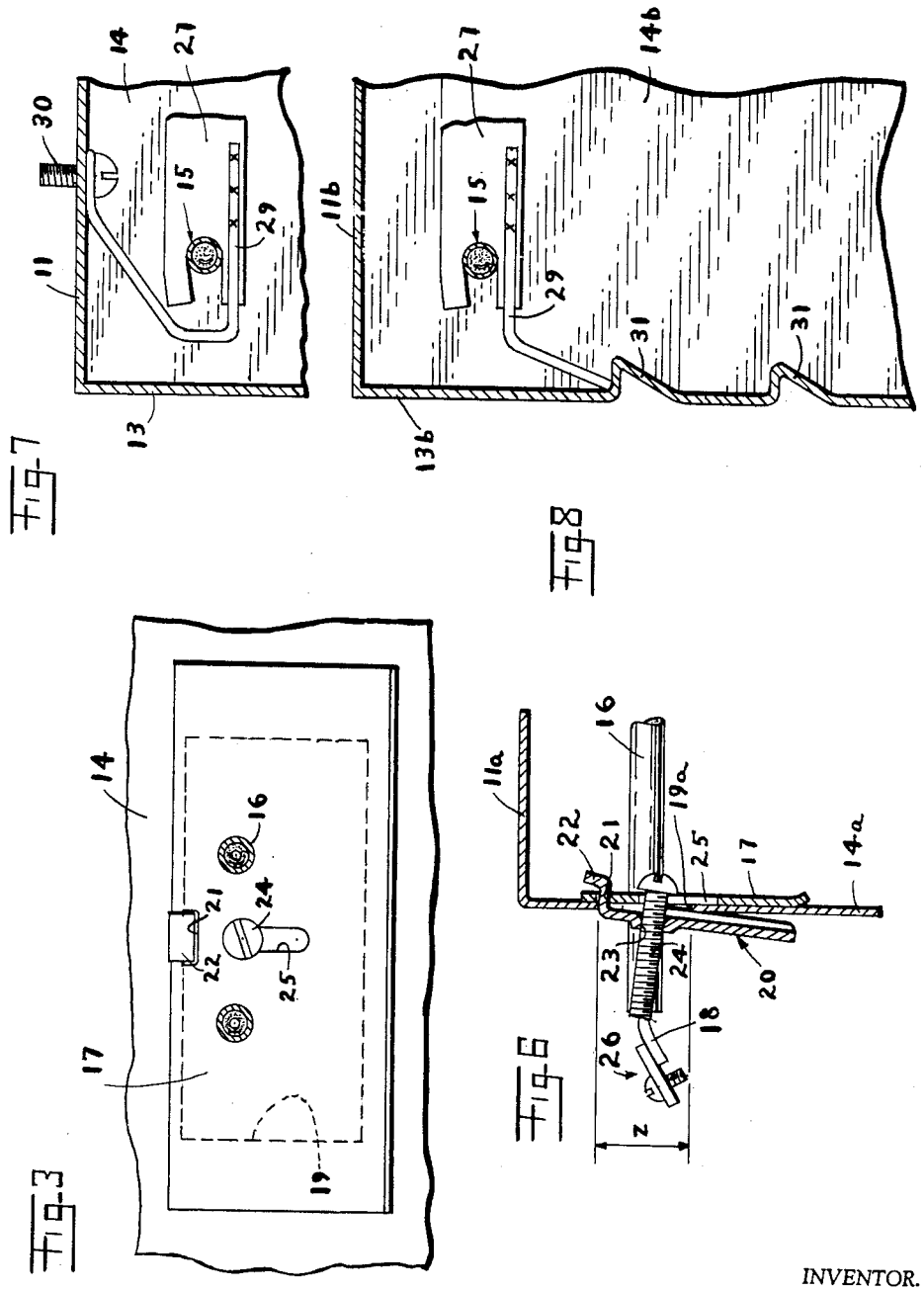
INVENTOR.
G. Edward Ammerman
BY
Attorney United States Patent Office 2,992,312
Patented July 11, 1961

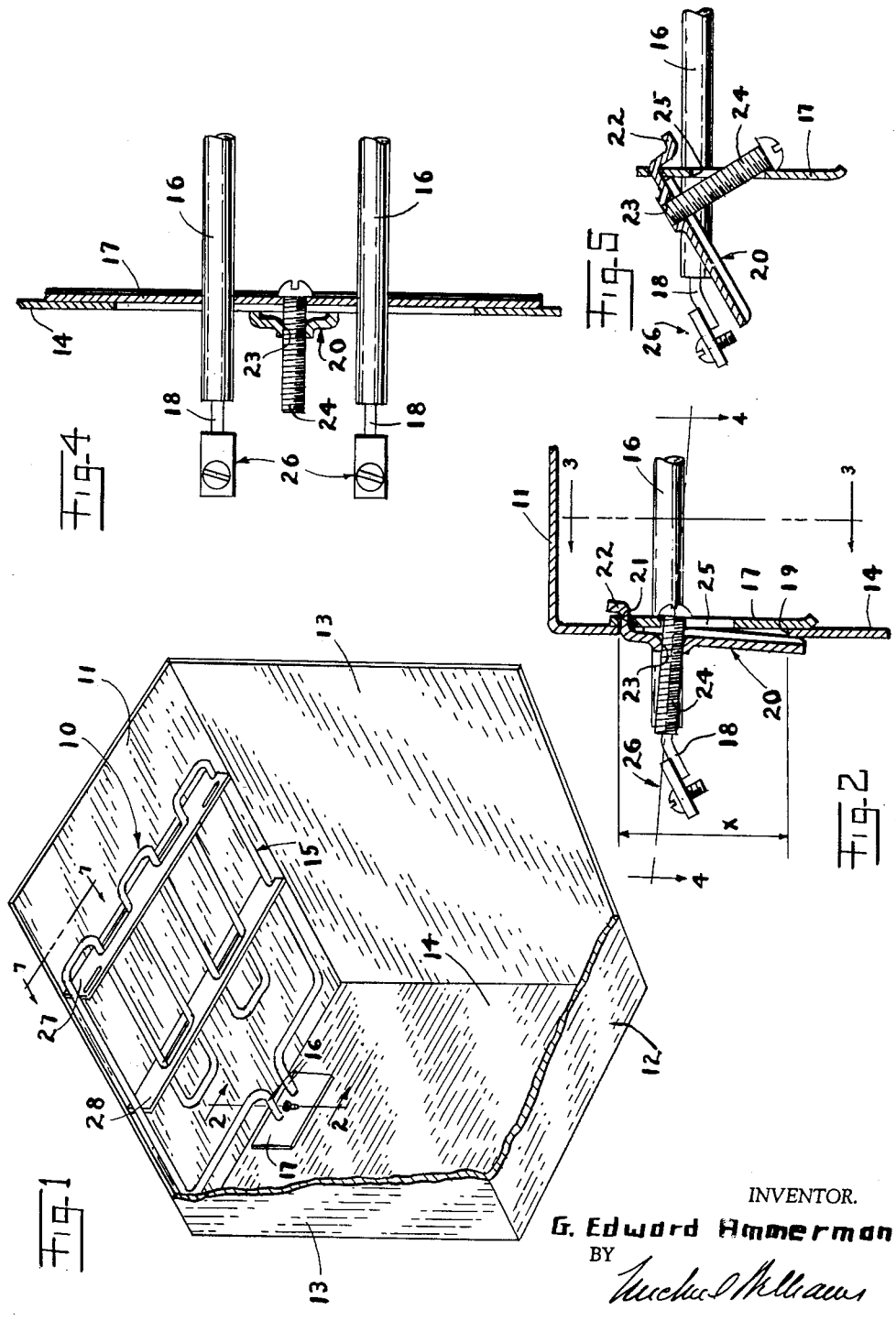

2,992,312
ELECTRIC HEATERS
George E. Ammerman, Oakmont, Pa., assignor to
The Edwin L. Wiegand Company
Filed June 20, 1957, Ser. No. 666,881
13 Claims. (Cl. 219—19)

The present invention relates to electric heaters, more particularly to electric heaters of the type employed in domestic electric ranges for broiling and the like, and the principal object of the invention is to provide new and improved heaters of such character.

Most domestic electric ranges are provided with an electric heating element, known as a broiler element, which cooks food positioned beneath it by means of radiation. For practical considerations, this element is usually positioned within and adjacent the top wall of the oven; however, it is to be understood that this element may be otherwise located.

In the past, most of these elements were of the plug-in type; that is, the rear wall of the oven was formed with an aperture in which a dielectric socket member was mounted and to which the electric wiring was connected. The element was provided with prongs which, when inserted in the socket, connected the element into the electrical power circuit.

This construction, while generally satisfactory, presents a serious problem in field servicing. There was no standardization of the socket members nor of the elements adapted for use therewith; accordingly, each make of range and frequently different models of the same make require their own peculiar element.

Because of the great number of makes and models of ranges in present use, it is a practical impossibility to stock the diversity of broiler elements necessary to provide satisfactory servicing for these ranges. Accordingly, a great need exists for a replacement broiler element which may readily be installed in practically any range regardless of its age, make, or manufacture.

The present invention provides a broiler element which may readily be installed in virtually any make or model electric range regardless of the type or manufacture of the broiler element with which it was originally equipped. Other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a perspective view of an oven having a broiler element constructed in accordance with the present invention mounted therein, FIGURE 2 is an enlarged fragmentary sectional view generally corresponding to the line 2—2 of FIGURE 1, FIGURE 3 is a fragmentary sectional view generally corresponding to the line 3—3 of FIGURE 2, FIGURE 4 is a fragmentary sectional view generally corresponding to the line 4—4 of FIGURE 2, FIGURE 5 is a view similar to FIGURE 2 but illustrating the element immediately before it is engaged with the oven wall, FIGURE 6 is a view similar to FIGURE 2 but showing the element mounted on an oven wall having a much smaller aperture than the wall aperture illustrated in FIGURE 2, FIGURE 7 is a fragmentary sectional view generally corresponding to the line 7—7 of FIGURE 1 and illustrating one way in which another portion of the element may be supported within the oven, and FIGURE 8 is a view similar to FIGURE 7 but illustrating another way in which such element portion may be supported.

As will hereinafter be pointed out, the heating element of the present invention is adapted to be secured to an apertured wall and when it is used as a replacement for a plug-in type of element, it extends through the aperture in which the socket member (not shown) was seated and which has been removed and discarded.

Referring to FIGURE 1, the heating element 10 of the present invention is shown mounted within an enclosure such as an oven having a top wall 11, a bottom wall 12, side walls 13 and a rear wall 14. Although not shown, a suitable door normally closes the front of the oven. While the element is herein shown mounted on rear wall 14 adjacent to the top wall 11, it is to be understood that the disposition of the element in this manner is illustrative only and is not to be considered as a limitation.

The heating element herein disclosed is preferably of the well-known type wherein a conductor of relatively high electrical resistance and having end portions of relatively low electrical resistance is disposed in an elongated, tubular metallic sheath whereby the low resistance portions extend from respective ends of the sheath and whereby the conductor portions are insulated from the interior wall of the sheath by suitable electric-insulating, heat-conductive material. The element thus constituted provides an intermediate heat generating portion (that portion adjacent the high resistance conductor portion), terminal end portions (those portions adjacent respective low resistance element portions), and terminal connector portions to which the electrical connections may be made (those low resistance conductor portions which project from respective ends of the sheath).

As illustrated in FIGURE 1, the intermediate heat generating portion 15 of element 10 is formed to provide a suitable heating pattern and respective terminal end portions 16 of the element are disposed in spaced side by side relation. A plate 17 extends across terminal end portions, or legs 16, and projects radially thereof to provide a flange for a purpose to be seen. Plate 17 may be crimped, welded, or in any other suitable manner fixedly secured to terminal legs 16. Terminal leg portions 16 extend through and project beyond plate 17 (see especially FIGURE 4) so as to dispose terminal connector portions 18 of the element on one side of the plate and to dispose heat generating portion 15 on the other side of the plate.

Referring to FIGURE 2, the element is adapted to be secured to wall 14 with plate 17 overlying and covering an aperture 19 in the wall and with terminal legs 16 extending through the aperture so as to dispose the heat generating portion of the element on one side of the wall and within the oven and to dispose the terminal connector portions on the other side of the wall and outside the oven.

Means are carried by the element to provide for its ready attachment to wall 14 by working entirely from inside the oven and without altering in any way the oven wall. As herein disclosed, a clamp member 20 is carried by the element for engagement behind wall 14 whereby the clamp member and the plate 17 provide respective abutments between which the wall 14 may be clamped to secure the element thereto.

Clamp member 20 preferably comprises an elongated member which is channel-shaped in cross-section (see FIGURE 4) for strength. Member 20 normally extends transversely of element leg portions 16 an amount to extend beyond the lower margin (in the position of parts shown) of aperture 19. For a purpose to be disclosed, member 20 is pivotally secured to plate 17 in the following manner. In the position of parts shown, plate 17 is provided with a slot 21 adjacent its upper margin through which projects a tongue 22 provided by member 20. Tongue 22 and the defining margins of slot 21 cooperate to provide a hinge joint about which the clamp member is swingable as will be readily understood.

To provide for drawing clamp member 20 toward plate 17 so as to clamp wall 14 therebetween, an intermediate portion of the clamp member is provided with an internally threaded, extruded aperture 23. A screw 24 passes through an aperture 25 in plate 17 and is threaded through aperture 23 of the clamp member. Note that in the position of parts shown in FIGURES 2 and 3, aperture 25 in plate 17 is elongated vertically to provide a slot for a purpose to be seen.

Installation of the present element, from entirely within the oven, will be as follows: The electric wires which are disposed behind oven wall 14 will be drawn through aperture 19 to the interior of the oven whereupon they will be electrically connected to suitable connection lugs or the like 26 carried by respective terminal connector portions 18. Screw 24 will then be rotated so that its head is spaced as far as possible from the clamp member and the screw head then pushed toward plate 17 until the head abuts the plate (see FIGURE 5). This will cause clamp member 20 to rotate about its pivot from a position extending generally transversely of terminal legs 16 to position wherein it more nearly extends longitudinally of the terminal legs. With the clamp member thus positioned, the terminal leg portions 16 and the clamp member may readily be passed through wall aperture 19 to abut the wall with plate 17 whereby the latter overlies and covers the wall aperture. Screw 24 will then be rotated to draw clamp member 20 toward plate 17 to clamp the wall 14 therebetween and thus secure the element to the wall.

As previously mentioned, the present element may be called upon for use with ovens having many different sizes of wall apertures and as shown in FIGURE 6, the element may be used as readily with an oven having a rear wall 14a whose aperture 19a has a vertical height indicated at "z" as with wall 14 whose aperture 19 has a vertical height indicated at "x." Note that when clamp member 20 is positioned as indicated in FIGURE 5, the clamp member and the element legs may readily be passed through a wall aperture as small as that illustrated in FIGURE 6.

Under many circumstances, attaching the element to the apertured wall of the oven as above described will prove to be adequate; however, there are circumstances when it may be desirable to support the element portion spaced from flange plate 17. While the support of this end of the heating element may be accomplished in many ways, the following construction has been found to be highly desirable from a standpoint of simplicity, low cost and ease of adaptability to virtually any range construction.

As seen in FIGURE 1, most broiler elements have secured thereto one or more metal strips 27, 28 which serve to add rigidity to the various legs of the heat generating portion. As best shown in FIGURE 7, the present invention contemplates welding or otherwise securing to each end of strip 7 a piece of annealed wire 29. Each wire, at installation, may be freely bent so that it may be engaged beneath the head of one of the usual screws 30 which extend through either the top wall of the oven, as shown, or through the adjoining side wall.

Another way in which wire 29 may be used to support the element is shown in FIGURE 8 wherein there is illustrated an oven whose side walls 13b have spaced, horizontally extending ridges 31 which are adapted to support a shelf which in turn supports the food to be broiled. With this arrangement, each wire 29 may be bent so that it engages a respective adjoining ridge 31 to thereby support the element.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. An electric heating element securable to an apertured wall, comprising an elongated sheathed electric heating element disposed for extension through the aperture in the wall, and means carried by said element providing a pair of abutments extending generally transversely of said element an amount sufficient to project beyond a predetermined size wall aperture margin and spaced apart from each other for engagement with respective sides of said wall adjacent its aperture, one of said abutments being shiftable relative to the other, to extend generally longitudinally of said element to provide for its ready passage through wall apertures of a smaller predetermined size and said abutments being relatively movable toward each other to clamp said wall therebetween to secure said element thereto.

2. An electric heating element securable to an apertured wall, comprising an elongated sheathed electric heating element disposed for extension through the aperture in the wall, means carried by said element providing a pair of abutments each normally positioned to extend generally transversely of said element an amount sufficient to project beyond a predetermined size wall aperture margin and spaced apart from each other for engagement with respective sides of said wall adjacent its aperture, one of said abutments being fixedly carried by said element and the other being hingedly carried by said element to provide for its movement from said normal position to a second position wherein it extends generally longitudinally of said element to permit ready passage of said other abutment through wall apertures of a smaller predetermined size, and means for drawing said other abutment from said second position toward said normal position to clamp said wall therebetween to secure said element thereto.

3. An electric heating element securable to an apertured wall, comprising an elongated sheathed electric heating element disposed for extension through the aperture in the wall, flange means carried by and extending radially of said element an amount sufficient to project beyond a predetermined size wall aperture margin, a clamp member hingedly carried by said flange means and normally extending generally parallel with said flange means and transversely of said element an amount sufficient to project beyond said predetermined size wall aperture margin, said clamp member being swingable from said normal position to a second position wherein it extends generally longitudinally of said element to permit ready passage of said clamp member through wall apertures of a smaller predetermined size, and means for drawing said clamp member from said second position toward said normal position to clamp said wall therebetween to secure said element thereto.

4. An electric heating element securable to an apertured wall, comprising an elongated sheathed electric heating element disposed for extension through the aperture in the wall and having a heat generating portion disposed on one side of said wall and a terminal connector portion disposed on the other side of said wall, flange means carried by and extending radially of said element and adapted to lie against said one wall side to at least partially overlie and cover the aperture therein, a clamp member hingedly carried by said flange means and normally extending generally parallel with said flange means and transversely of said element an amount sufficient to project beyond a predetermined size wall aperture margin, said clamp member being swingable from said normal position to a second position wherein it extends generally longitudinally of said element to permit ready passage of said clamp member from said one wall side to said other wall side through wall apertures of a smaller predetermined size, and means operable from said one side of said wall for drawing said clamp member from said second position toward said normal position to clamp said wall therebetween to secure said element thereto.

5. An electric heating element securable to an apertured wall, comprising an elongated sheathed electric heating element having an intermediate heat generating portion, terminal leg portions extending from respective ends of said heat generating portion and disposed in side by side relation, and terminal connector portions at the free ends of respective terminal leg portions, flange means carried by and extending radially of said element leg portions and adapted to lie against one wall side to at least partially overlie and cover the aperture therein when said element is disposed with its terminal leg portions extending through said wall aperture and with its heat generating portion disposed on said one wall side and its terminal connector portions projecting from said other wall side, a clamp member hingedly carried by said flange means and normally extending generally parallel with said flange means and transversely of said terminal leg portions an amount sufficient to project beyond a predetermined size wall aperture margin, said clamp member being swingable from said normal position to a second position wherein it extends generally longitudinally of said terminal leg portions to permit ready passage of said clamp member from said one wall side to said other wall side through wall apertures of a smaller predetermined size, and means operable from said one wall side for drawing said clamp member from said second position toward said normal position to clamp said wall therebetween to secure said element thereto.

6. An electric heating element securable to an apertured wall, comprising an elongated sheathed electric heating element having an intermediate heat generating portion, terminal leg portions extending from respective ends of said heat generating portion and disposed in side by side relation, and terminal connector portions at the free ends of respective terminal leg portions, flange means carried by and extending radially of said element leg portions and adapted to lie against one wall side to at least partially overlie and cover the aperture therein when said element is disposed with its terminal leg portions extending through said wall aperture and with its heat generating portion projecting from said one wall side and its terminal connector portions projecting from the opposite wall side, a clamp member hingedly carried by said flange means and normally extending generally parallel with said flange means and transversely of said terminal leg portions an amount sufficient to project beyond a predetermined size wall aperture margin, said clamp member being swingable from said normal position to a second position wherein it extends generally longitudinally of said terminal leg portions to permit ready passage of said clamp member from said one wall side to said other wall side through wall apertures of a smaller predetermined size, and screw means extending through a slot formed in said flange means and having threaded engagement with a portion of said clamp means spaced from its hinge, said screw means having an enlarged head which abuts the side of said flange means spaced from said one wall side and said screw means being rotatable from said one wall side to draw said clamp member from said second position toward said normal position to clamp said wall therebetween to secure said element thereto.

7. A clamp assembly for holding a sheathed electric heating element in position relative to a supporting wall wherein a portion of said element extends transversely of said wall and through an aperture therein, comprising a first plate member secured transversely to said heating element portion and flatwise overlying and abutting one side of said supporting wall to thus limit projection of said heating element portion through the wall aperture, and a second plate member flat wise overlying and abutting the opposite side of said supporting wall, means for drawing said plate members together to clamp the supporting wall therebetween, said second plate member being movable to edgewise disposition relative to said supporting wall to decrease its effective transverse size and enable it to be disposed through wall apertures of relatively small size.

8. A clamp assembly for holding a sheathed electric heating element in position realtive to a supporting wall wherein a portion of said element extends transversely of said wall and through an aperture therein, comprising a first plate member secured transversely to said heating element portion and flatwise overlying and abutting one side of said supporting wall to thus limit projection of said heating element portion through the wall aperture, and a second plate member hinged to said first plate member and normally disposed in juxtaposed relation therewith for flatwise overlying and abutting the opposite side of said supporting wall, means for drawing said plate members together to clamp the supporting wall therebetween, the hinged mounting of said second plate member enabling it to be disposed edgewise relative to said supporting wall to decrease its effective transverse size and enable it to be disposed through wall apertures of relatively small size.

9. A clamp assembly for holding a sheathed electric heating element in position relative to a supporting wall wherein a portion of said element extends transversely of said wall and through an aperture therein, comprising a first plate member secured transversely to said heating element portion and flatwise overlying and abutting one side of said supporting wall to thus limit projection of said heating element portion through the wall aperture, said first plate member having an opening adjacent an upper margin and having also a vertical slot, a second plate member having a tongue fitting into the opening in said plate member to provide a hinge joint therebetween and said tongue being off-set so that said second plate member flatwise overlies and abuts the opposite side of said supporting wall, a screw having its head bear against said first plate member and its shank passing through said vertical slot and threaded into said second plate member for drawing said plate members together to clamp the supporting wall therebetween, said second plate member being tiltable to edgewise relation relative to said supporting wall by backing off said screw and tilting the latter in its vertical slot, said edgewise relation of said second plate member reducing its effective transverse size to enable it to be disposed through wall apertures of relatively small size.

10. A clamp assembly for holding a sheathed electric heating element in position relative to a supporting wall wherein a portion of said element extends through an aperture in said wall comprising a pair of abutment members carried by and extending transversely of said heating element portion an amount sufficient to engage respective opposite sides of said supporting wall adjacent the wall aperture, one of said members being fixed relative to said heating element portion and the other being shiftable relative to such portion to reduce its amount of transverse extension and provide for its projection through a wall aperture of relatively small size and thereafter shiftable relative to said element portion to increase its transverse extension for engagement with its respective wall side.

11. A clamp assembly for holding a sheathed electric heating element in position relative to a supporting wall wherein a portion of said element extends through an aperture in said wall, comprising a plate member extending transversely of said heating element portion and flatwise abutting one side of said supporting wall to limit projection of said heating element portion through the wall aperture, a clamp member normally extending transversely of said element portion and having a first portion pivotally connected with said plate member adjacent a margin thereof and having a second portion terminating adjacent an opposite margin of said plate member for engagement with the other side of said supporting wall, said clamp member being pivotable from its normal position extending transversely of said element portion toward a position extending longitudinally of said element portion to provide for projection of said clamp member through relatively small apertures, and means adjacent the pivotal connection aforesaid for drawing said clamp member to its normal position to clamp said supporting wall between said plate member and said clamp member.

12. A heater assembly securable to an apertured wall, comprising, a sheathed electric resistance heating element having a pair of portions extending through the wall aperture in side by side relation, a plate member through which said element portions project and secured to and connecting such portions together and extending flatwise of the wall to overlie its aperture and abut one wall side to limit extension of the element portions through the wall aperture, and clamp means extending transversely of said element portions for engagement with the other side of the wall for clamping the latter between said plate means and said clamp means to thus secure said element to the wall, the amount of transverse extension of said clamp means being reducible to provide for its projection through a wall aperture of relatively small size and thereafter its amount of transverse extension being increasable to provide for its engagement with said other wall side.

13. A heater construction for use with ovens which have heating element support surfaces at various positions, comprising a metal-sheathed tubular electric heating element having a pair of terminal portions in juxtaposed relation and an active heating portion of loop shape and including at least two spaced side portions, a support member extending crosswise of and rigidly secured to said terminal portions for supporting said heating element from an oven wall in cantilever fashion, sheet metal brace means extending crosswise of said side portions and having forked opposite ends each providing a recess for receiving a respective side portion and straddling legs which are deformed to retain said side portion in its recess, and ductile wire means having a first portion rigidly connected to said brace means and a second portion extending from the latter and outwardly beyond the adjacent heating element side portion, said second portion being adapted to be bent to a configuration corresponding to a support surface of a selected one of said ovens so that it may fit said support surface and cooperate therewith to relieve said support member of some of the supporting strain.

References Cited in the file of this patent

UNITED STATES PATENTS

| | | |
|---|---|---|
| 1,577,193 | Reed | Mar. 16, 1926 |
| 1,594,222 | Thomas | July 27, 1926 |
| 1,688,853 | Clayton | Oct. 23, 1928 |
| 1,699,280 | Clayton | Jan. 15, 1929 |
| 2,137,149 | Tuttle | Nov. 15, 1938 |
| 2,180,600 | Mills | Nov. 21, 1939 |
| 2,442,900 | McCormick | June 8, 1948 |
| 2,502,553 | Ball | Apr. 14, 1950 |
| 2,515,579 | Allen | July 18, 1950 |
| 2,568,942 | Bindel | Sept. 25, 1951 |
| 2,770,436 | Linhardt | Nov. 13, 1956 |
| 2,844,703 | Prather | July 22, 1958 |
| 2,850,612 | Quirk | Sept. 2, 1958 |

FOREIGN PATENTS

| | | |
|---|---|---|
| 636,432 | Great Britain | Apr. 26, 1950 |
| 1,113,892 | France | Dec. 12, 1955 |